Figure 1:
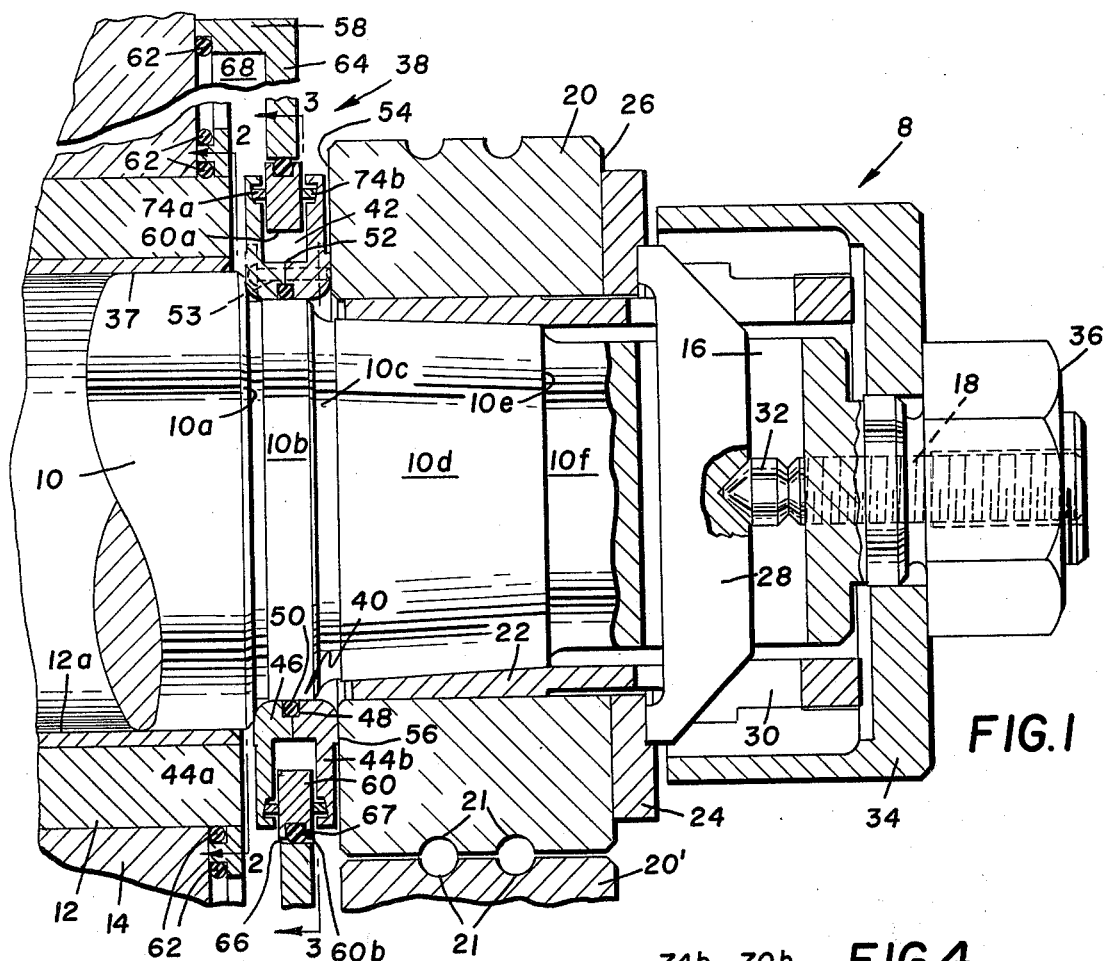

United States Patent [19]

Rich, Jr.

[11] 3,884,535

[45] May 20, 1975

[54] SEAL

[75] Inventor: Charles A. Rich, Jr., Southboro, Mass.

[73] Assignee: Morgan Construction Company, Worcester, Mass.

[22] Filed: Apr. 29, 1974

[21] Appl. No.: 464,838

[52] U.S. Cl. .............. 308/36.1; 308/187; 308/36.1; 308/36.2
[51] Int. Cl. .......................... F16c 1/24; F16c 33/72
[58] Field of Search ................. 308/36.1, 36.2, 187; 277/95

[56] References Cited
UNITED STATES PATENTS

| | | | |
|---|---|---|---|
| 2,566,679 | 9/1951 | Sendzimir et al. .................. | 308/187 |
| 2,913,169 | 11/1959 | Wilsmann ........................... | 308/36.1 |
| 2,955,001 | 10/1960 | Rich, Jr. ............................ | 308/36.1 |
| 3,097,023 | 7/1963 | Nojima ............................... | 308/36.2 |
| 3,223,463 | 12/1965 | Povath .............................. | 308/36.1 |

Primary Examiner—Lloyd L. King
Attorney, Agent, or Firm—Thompson, Birch, Gauthier & Samuels

[57] ABSTRACT

A seal for use between a housing and a rotatable shaft is disclosed. The seal includes a circular first assembly mounted on the shaft for rotation therewith, the said first assembly having an outer peripheral groove formed between a pair of radially extending flingers. A second assembly sealingly engages the housing, with an annular portion thereof protruding radially inwardly into the peripheral groove of the first assembly, and with the surfaces of the protruding annular portion being spaced relative to the adjacent surfaces of the groove. Circular wear rings carried by the flingers frictionally engage the protruding annular portion of the second assembly.

10 Claims, 7 Drawing Figures

SEAL

DESCRIPTION OF THE INVENTION

This invention relates generally to seals, and is concerned in particular with a novel and improved seal for use between a rotatable shaft and a housing containing the shaft bearings. The invention is especially suited for, although not limited in application to, rolling mill installations where pairs of roll shafts are journalled for rotation in roll housings, with the ends of the shafts protruding from the housings to receive work rolls in removable engagement thereon, and with roll parting adjustment means being employed to vary the spacing between the roll shafts and the work rolls during the rolling operation.

In rolling mill installations of the type referred to above, seals are normally employed between the roll shafts and the roll housings, the function of the seals being to prevent loss of lubricating oil being applied to the shaft bearings, and also to prevent exterior contaminants such as for example cooling water, mill scale, etc. from penetrating into the shaft bearings and contaminating the lubricating oil. In the past, such seals have conventionally been characterized by non-rotatable flexible lip seals which surround the protruding roll shaft ends and which are supported by seal plates in sealing engagement with the roll housings. The lip seals engage annular surfaces on components which are mounted on the roll shaft for rotation therewith. Typically, such components may include an annular flinger and an annular end face of the work roll.

Although this type of seal arrangement has been widely employed with generally satisfactory results, it has been found that some oil leakage and oil contamination is experienced when, as a result of roll parting adjustments, the rotational axes of the roll shafts and the components mounted thereon are no longer concentrically arranged in relation to the surrounding lip seals. To a considerable extent, this leakage and contamination is due to the following: when a roll shaft and the components mounted thereon are arranged concentrically in relation to the surrounding lip seals, a given point on one of the annular surfaces contacted by a lip seal will not shift radially in relation to the lip seal as the shaft rotates. However, should the axis of the roll shaft be shifted to a non-concentric position relative to the axis of the surrounding lip seal, for example as the result of a roll parting adjustment, then as the shaft rotates, the same point will undergo constant radial shifting towards and away from the circular line of lip seal contact. Points directly adjacent to the lip seal will shift radially back and forth across the lip seal. As such points move radially outwardly across the lip seal, they will have a tendency to carry lubricating oil with them and this lubricating oil will ultimately be lost. Likewise, as the same points shift back radially inwardly across the lip seal, they will have a tendency to carry with them cooling water and other contaminants which will then be mixed with the lubricating oil.

A general object of the present invention is to provide a novel and improved seal which obviates the problems and disadvantages noted above.

A more specific object of the present invention is the provision of a seal having annular surfaces surrounding the roll shaft, the said surfaces being engaged by circular seal rings which are concentrically carried by the roll shaft for rotation therewith. With this construction, radial shifting of the seal rings relative to the surrounding annular surfaces is eliminated, except perhaps when roll parting adjustments are actually being performed, with the result that the efficiency of the seal is markedly improved.

Figures 2, 3, 4:
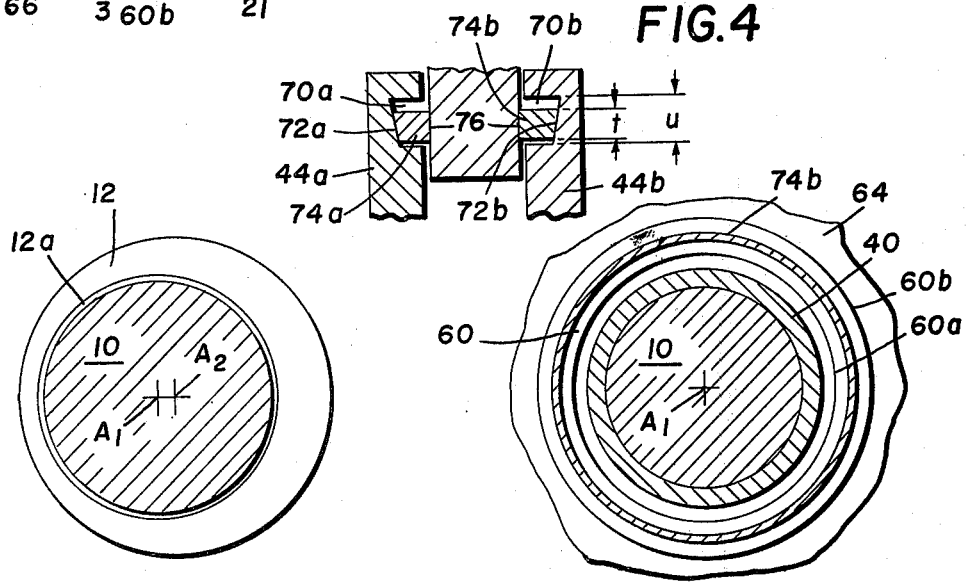
Figure 5:
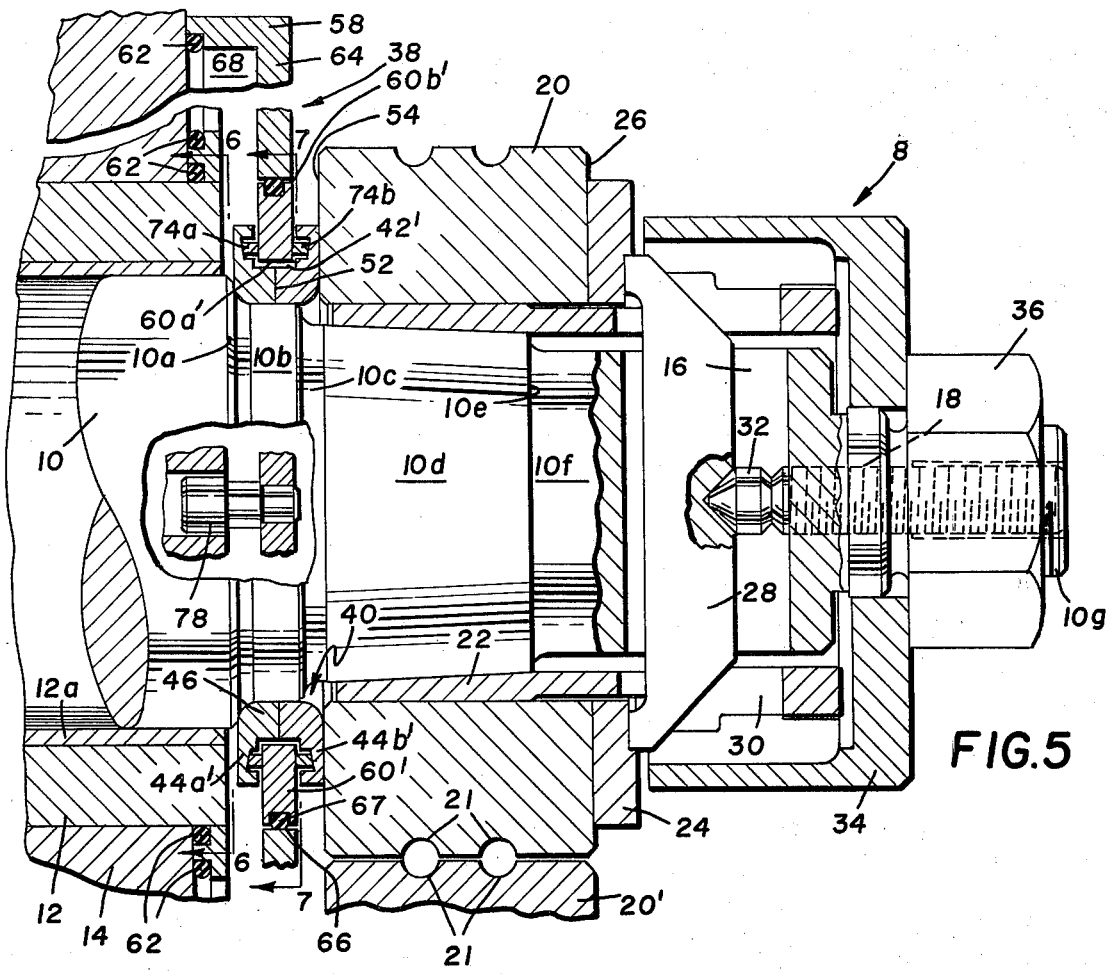
Figure 6:
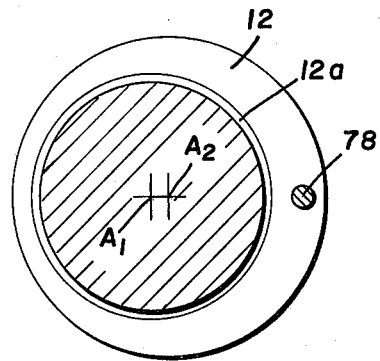
Figure 7:
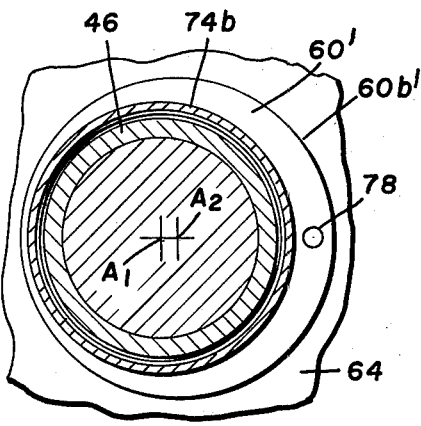

These and other objects and advantages of the present invention will become more apparent as the description proceeds with the aid of the accompanying drawings wherein:

FIG. 1 is a sectional view through a roll assembly in a rolling mill roll, showing one embodiment of a seal in accordance with the present invention;

FIGS. 2 and 3 are sectional views taken along lines 2—2 and 3—3 of FIG. 1;

FIG. 4 is an enlarged sectional view of a portion of the seal shown in FIG. 1;

FIG. 5 is a sectional view similar to FIG. 1 showing an alternate embodiment of the invention; and, FIGS. 6 and 7 are sectional views taken along lines 6—6 and 7—7 of FIG. 5.

Referring now to FIGS. 1 to 4 of the drawings, a typical "cantilevered" or "overhung" roll assembly 8 for a rolling mill is shown, including a roll shaft 10 journalled for rotation in an eccentric sleeve 12 which preferably although not necessarily includes a replaceable liner or bushing 12a. The eccentric sleeve 12 is in turn journalled for adjustable rotation in a roll housing 14. As is best shown in FIG. 2, the rotational axis $A_1$ of the roll shaft 10 is spaced laterally from and parallel to the rotational axis $A_2$ of the eccentric sleeve 12. A work roll 20 is mounted on the roll shaft 10. The work roll has grooves 21 which cooperate with identical grooves on a mating roll 20' to roll product being directed therebetween. Rotatable adjustment of the eccentric sleeve 12 will produce a shifting of the roll shaft 10 and the work roll 20 mounted thereon relative to its mate 20'. Such adjustments are periodically performed during a rolling operation to compensate for wear of the roll grooves 21 and to control the cross-section of the product being rolled. The construction of the roll housing as well as the means employed to rotatably adjust the eccentric sleeve in relation to the housing are well known to those skilled in the art and thus a further description of these components will not be included therein. Also, although the following description will be directed to the roll assembly 8 of roll 20, it will be understood that the roll assembly of its mating roll 20' is basically the same.

The roll shaft 10 has an end which protrudes axially from the roll housing 14. As viewed from left to right in FIG. 1, this protruding end includes a shoulder 10a, short cylindrical section 10b of reduced diameter, a shoulder 10c, a tapered section 10d, another shoulder 10e, a further reduced diameter section 10f and a threaded end 10g. Section 10f is provided with a transverse slot 16, and a threaded bore 18 extends axially through the threaded end 10g and the section 10f into communication with the transverse slot 16. The work roll 20 is axially mounted on the protruding end of the roll shaft and is held in place on the tapered section 10d by a collet member 22 tightly inserted therebetween. A retainer ring 24 is held against the outer annular face 26 of the work roll by means of a key 28 which extends through the transverse slot 16 in the roll shaft and a corresponding transverse slot 30 in the collet member 22. The key 28 is held in place by means of a retaining screw 32 which is threaded through the bore 18. A cover 34 is inserted over the shaft end and held in place by a nut 36 threaded onto the shaft end 10g.

During a rolling operation, lubricating oil is continuously supplied as at 37 between the roll shaft 10 and the eccentric sleeve bushing 12a, and a solution of cooling water and rolling lubricant is continuously applied to the surfaces of the rolls 20, 20'. The present invention is directed to a seal generally indicated at 38, which is located between the roll housing 14 and roll shaft 10, and which operates to prevent the loss of lubricating oil while at the same time preventing exterior contaminants from penetrating into the housing interior.

Seal 38 includes a first sealing means or assembly 40 which is mounted tightly on and in sealing engagement with the reduced diameter shaft section 10b for rotation with the shaft. As herein employed, the term "sealing engagement" is intended to cover the combination of two components in a manner which precludes or at least substantially minimizes any fluid leakage therebetween. The assembly 40 has a radially outwardly facing peripheral groove 42 which is defined by a pair of oppositely disposed flanges or flingers 44a, 44b which extend radially outwardly from a base 46. The base is grooved internally as at 48 to receive an O-ring 50. Preferably, for ease of fabrication, the assembly 40 is centrally subdivided as at 52 into two abutting generally L-shaped sections held together by pins or the like typically shown at 53. The assembly 40 is axially inserted on the protruding roll shaft end and is held in place against the shaft shoulder 10a by the inner annular face 54 of the work roll 20 which presses against an exterior shoulder 56 at the base of flange 44b.

A second sealing means or assembly extends between the roll housing 14 and the first sealing means 40. The second sealing means includes a seal cover 58 which acts as an intermediate support for an annular wear ring 60. The seal cover 58 is removably secured to the housing 14 by bolts or other conventional means (not shown), and is in sealing engagement with the housing and the end of the eccentric sleeve 12 through the use of O-rings 62. The seal cover 58 has a face plate 64 in alignment with the groove 42, with a circular opening 66 therein through which the roll shaft end protrudes. The seal cover 58 cooperates with the face of the roll housing to define a chamber 68 which receives the lubricating oil escaping at 37 from between the roll shaft 10 and the eccentric sleeve bushing 12a. Drain means (not shown) connects the chamber 68 to the mill's lubricating oil system.

The annular wear ring 60 protrudes radially into the groove 42, and its inner and outer circular edges 60a, 60b are arranged concentrically with each other and with the inner circular edge of the opening 66 in the faceplate 64. The surfaces of the portion of wear ring 60 which protrude into the groove 42 are spaced from the adjacent groove surfaces, thereby establishing a labyrinth-type relationship which of itself is a deterrent to the leakage of either oil or exterior contaminants between the wear ring 60 and the rotating assembly 40. The outer edge 60b of ring 60 is grooved to accept an O-ring 67 which establishes a sealing relationship between the inner circular edge of the opening 66 in the faceplate 64 and the wear ring.

As is best shown by a combined reference to FIGS. 1 and 4, the flingers 44a, 44b on assembly 40 are provided with opposed circular grooves 70a, 70b which open inwardly into the peripheral groove 42. Each of the grooves has a bottom surface 72a, 72b which are inclined at an angle relative to the central axis of the assembly 40. A circular seal ring 74a, 74b is mounted in each of the grooves 70a, 70b. Each seal ring has one inclined end in face-to-face engagement with the inclined bottom surface 72a, 72b of the groove 70a, 70b in which it is mounted, and an opposite end in frictional engagement as at 76 with the annular end surfaces of the portion of the wear ring 60 which protrudes into the groove 42. The radial thickness $t$ of each seal ring is less than the width $w$ of the groove 70a, 70b. The seal rings 74a, 74b are contained within the grooves 70a, 70b and rotate with the sealing assembly 40, while the wear ring 60 remains stationary. The grooves 70a, 70b and the seal rings 74a, 74b are concentric relative to the assembly 40 and the rotational axis $A_1$ of the roll 10. The frictional engagement as at 76 between the seal rings 74a, 74b and the sides of the wear ring creates heat which may cause the wear rings to expand slightly during operation of the apparatus. This expansion (and subsequent retraction upon cooling) is accommodated by radial ring movement in the grooves 70a, 70b which in turn is allowed to take place due to the face-to-face contact between the inner inclined seal ends and the inclined bottom surfaces 72a, 72b of the grooves, and the greater width $w$ of the grooves relative to the radial thicknesses $t$ of the rings.

In light of the above, it will now be appreciated that during operation of the mill, the seal 38 functions as follows: the first sealing means or assembly 40 rotates with the roll shaft 10 and work roll 20. The second sealing means, which includes the intermediate seal cover 58 and the annular wear ring 60 does not rotate. A sealing relationship between the seal cover and the wear ring is provided by the O-ring 67, and between the seal cover, roll housing and eccentric sleeve by the O-rings 62. A sealing relationship between the non-rotating annular wear ring 60 and the rotating assembly 40 is established by the seal rings 74a, 74b which are seated in grooves 70a, 70b of the flingers 44a, 44b, and which frictionally engage the sides of the wear ring as at 76. This sealing relationship is further enhanced by the labyrinth-type relationship established by the wear ring 60 and the surrounding adjacently spaced surfaces of the groove 42 into which the wear ring protrudes.

When roll parting adjustments are made by rotating the eccentric sleeve 12 about axis $A_2$ to produce a relative shifting of the roll shaft axis $A_1$, the seal assembly 40 and the seal rings 74a, 74b carried thereby undergo some radial shifting relative to the annular wear ring 60. The radial width of the wear ring 60 and the spacing between the inner edge 60a of the wear ring and the base 46 of assembly 40 are both sufficient to accommodate such shifting. It is important to note, however, that since the circular wear rings 74a, 74b are concentrically arranged relative to the axis $A_1$ of the roll shaft, their lines of contact as at 76 with the sides of the wear ring 60 will remain circular, regardless of roll parting adjustments. Hence, the overall effectiveness of the seal is markedly improved.

The O-ring closure at 67 between the outer edge of the wear plate 60 and the inner edge of the face plate 64 enables the wear ring 60, assembly 40 and the seal rings 74a, 74b to be axially removed and/or replaced as a single package unit. The O-ring also provides flexibility for shaft expansion or deflection.

The alternate embodiment shown in FIGS. 5–7 is largely identical to that shown in FIGS. 1–4, and to the extent that similarities are present, the same reference numerals have been employed. The difference between this alternate embodiment and that previously described lies mainly in the construction of the annular wear ring 60', which has inner and outer edges 60a' and 60b' non-concentrically arranged to provide an eccentric cross-section which matches that of the eccentric sleeve 12 (compare FIGS. 6 and 7). The wear ring 60' is connected by means of a pin 78 to the eccentric sleeve 12, and is thus rotatably adjustable therewith. With this arrangement, the inner edge 60a' of the wear ring 60' will remain concentric with the axis $A_1$ of the roll shaft, regardless of roll parting adjustments. Hence the spacing between the inner edge 60a' and the base 46 of assembly 40 can be kept smaller, and the lengths of the flingers 44a', 44b' and the depth of the peripheral groove 42' can be substantially lessened.

It is my intention to cover all changes and modifications to the embodiments herein chosen for purposes of disclosure which do not depart from the spirit and scope of the invention.

I claim:

1. Apparatus for providing a seal between a housing and a rotatable shaft, comprising: a circular first sealing means supported on said shaft for rotation therewith, said first sealing means having a radially outwardly facing peripheral groove; a second sealing means supported by said housing, said second sealing means having an annular portion surrounding said first sealing means and protruding radially inwardly into said groove, with the surfaces of said protruding portion being spaced relative to the adjacent surfaces of said groove; and circular third sealing means supported by and rotatable with said first sealing means, said third sealing means in frictional contact with the said protruding portion of said second sealing means.

2. The apparatus as claimed in claim 1 wherein said second sealing means is further characterized as comprising an intermediate support member in sealing engagement at one end with said housing, the other end of said support member terminating in a radially inwardly extending flange, the inner edge of which flange forms a circular opening having a diameter greater than that of the exterior diameter of said first sealing means, said second sealing means further including annular ring means in sealing engagement along its outer edge with the inner edge forming said circular opening, said annular ring means including the annular portion of said second sealing means which protrudes into said groove.

3. The apparatus as claimed in claim 1 wherein said first sealing means is provided with a generally U-shaped cross-section, including a circular base adapted for sealing engagement with said shaft and a pair of axially spaced oppositely disposed flanges extending radially outwardly from said base.

4. The apparatus as claimed in claim 3 wherein said base is provided with an inner groove disposed oppositely to said radially outwardly facing peripheral groove, and means seated in said inner groove for providing a seal between said base and said shaft.

5. The apparatus as claimed in claim 3 wherein said first circular sealing means is further characterized as comprising an assembly of two abutting elements, each of said elements having a generally L-shaped cross-section.

6. The apparatus as claimed in claim 3 wherein said flanges are provided with opposed annular faces having circular grooves therein, the said third circular sealing means being seated in and protruding axially outwardly from said circular grooves.

7. The apparatus as claimed in claim 6 wherein the bottom of each of said circular grooves is inclined relative to the axis of said first sealing means, and wherein the third circular sealing means seated in each of the said circular grooves has a radial thickness which is less than the radial width of said circular groove and an inclined inner edge which is in face-to-face contact with said inclined bottom, the outer edge of said third circular sealing means being in frictional contact with the said protruding portion of said second sealing means.

8. The apparatus as claimed in claim 1 wherein said shaft is journalled for rotation in an eccentric sleeve which is in turn journalled for rotation in said housing, the annular portion of said second sealing means having sufficient radial width to accommodate movement of said third sealing means occasioned by rotational adjustment of said eccentric sleeve.

9. The apparatus as claimed in claim 2 wherein said shaft is journalled for rotation about a first axis in an eccentric sleeve, and said sleeve is in turn rotatably adjustable in said housing about a second axis which is parallel to said first axis, the said annular ring means also having an eccentric configuration with its inner edge concentric with said first axis and its outer edge and the inner edge of the radially inwardly extending flange of said support member being concentric with said second axis, and means for connecting said annular ring means to said eccentric sleeve, whereby rotative adjustment of said eccentric sleeve relative to said housing will result in corresponding rotative adjustment being imparted to said annular ring means relative to said support member.

10. For use in combination with a roll shaft journalled for rotation in a roll housing, with one end of the roll shaft protruding from the housing to axially receive a roll removably mounted thereon, and with roll parting adjustment means assocaited with the roll housing for adjusting the roll shaft, apparatus for providing a seal between the roll shaft and the roll housing, comprising: a circular flinger assembly mounted on the roll shaft for rotation therewith, said flinger assembly having an exterior groove formed by a base in sealing engagement with the roll shaft and opposed axially spaced flanges extending radially outwardly from said base; a wear ring having axially spaced inner and outer faces and radially spaced inner and outer edges, intermediate means in sealing engagement with the roll housing and the outer edge of said wear ring for supporting said wear ring in an operative position in said groove, the wear ring when thus supported having its inner edge spaced radially from said base and its inner and outer faces spaced axially from said flanges; and seal rings supported by and protruding from said flanges into engagement with the inner and outer faces of said wear ring.

* * * * *